UNITED STATES PATENT OFFICE.

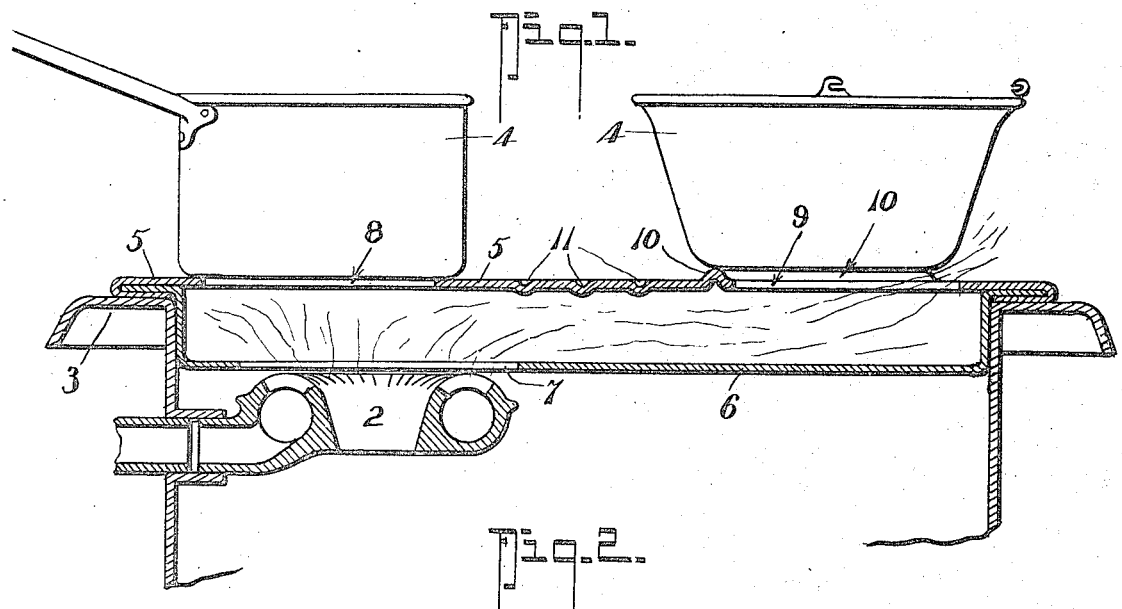
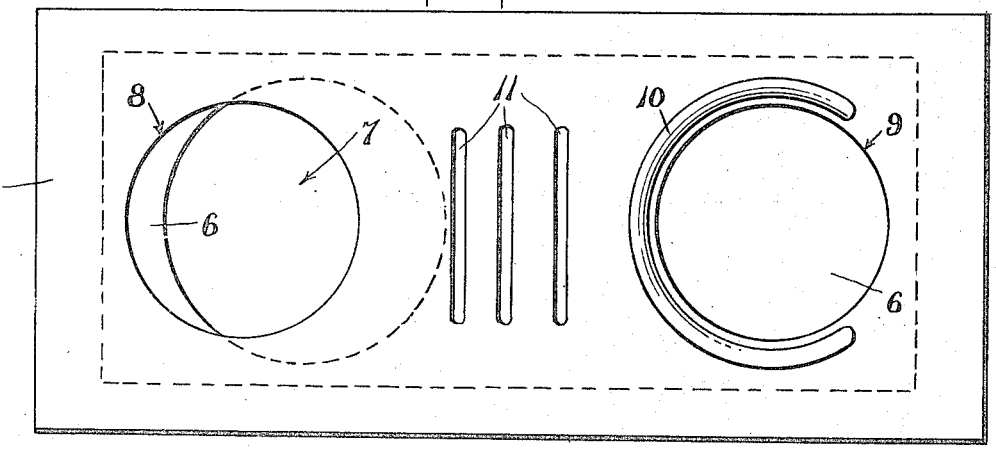
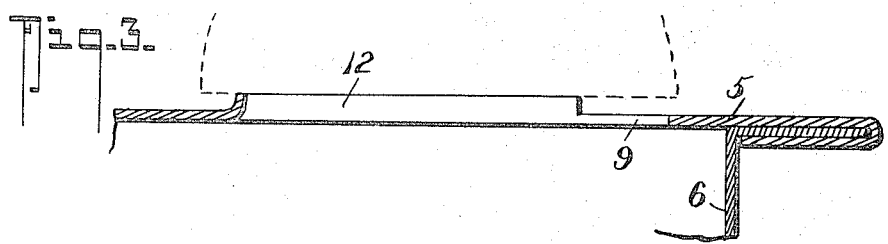

JOHN KENDALL, OF VANCOUVER, BRITISH COLUMBIA, CANADA.

GAS-STOVE HEAT-ECONOMIZER.

1,145,488.        Specification of Letters Patent.        Patented July 6, 1915.

Application filed April 5, 1915. Serial No. 19,216.

*To all whom it may concern:*

Be it known that I, JOHN KENDALL, a citizen of the Dominion of Canada, residing at Vancouver, in the Province of British Columbia, Canada, have invented certain new and useful Improvements in Gas-Stove Heat-Economizers, of which the following is a specification.

This invention relates to a heat economizer for a gas stove of that kind wherein the cooking vessel is supported over a Bunsen burner of ring form.

In the customary form of gas stove a Bunsen burner of ring form is provided under the location of each vessel and the vessel is supported on a grid, so that while the underside of the vessel is exposed to the direct heat of the burner the heated gases are allowed to escape around the sides of the vessel and much of the heat is wasted.

In the device, which is the subject of this application, the supporting grid is removed and as a substitute a shallow rectangular box having an aperture conforming closely to the ring of the burner is supported over it and in the upper side of this box an aperture is provided over the cover, and a second aperture adjacent the other end of the box, the second aperture having provision to support the cooking vessel above the plane of the box around the edge of the aperture, which is toward the burner, leaving a space on the farther side of the aperture between the edge of it and the bottom of the vessel resting on the support, by which means the heated products of combustion, after acting directly on the vessel over the burner, is induced to flow to the other aperture and escape under the edge of the vessel supported over it. By this means the heated gases, which were formerly wasted are conserved and utilized to heat another vessel.

The invention is particularly described in the following specification, reference being made to the drawings by which it is accompanied, in which:

Figure 1 is a longitudinal section showing the application of the device to the ring burner of a gas stove Fig. 2 is a plan of the same, and Fig. 3 shows an alternative provision for the escape of the products of combustion.

In these drawings 2 represents a Bunsen burner and 3 is the upper edge of the gas stove casing which usually supports an open grid surrounding the burner openings.

Supported on the upper edge 3 of the stove casing is a shallow elongated rectangular flue box having a top plate 5 and bottom plate 6. This flue box is preferably supported in the plane of the top plate 5 so that the bottom 6 is projected downward close to the plane of the upper surface of the burner 2, and this bottom plate 6 has a circular aperture 7 corresponding to the ring of the burner, but leaving a slight annular space between the edge of the aperture and the burner to satisfy the requirements of an induced draft.

In the top plate 5 are two circular apertures 8 and 9, that 8 being adjacent the ring burner and is such that a cooking vessel 4 resting on it substantially closes the aperture. The other aperture 9 has a ridge 10 embossed upward in the thickness of the metal so that a vessel may rest on it and be supported above the edge of the aperture in a manner that will prevent the escape of the hot gases under it on the side toward the burner but will provide free escape of the hot gases under it on the side farther from the burner. This provision of an exit for the hot gases from the burner on the farther side of the second cooking vessel will induce a flow of the hot gases under the bottom of that vessel.

Instead of a ridge 10 being embossed upward, as shown, the edge of the aperture 9 may be upturned, as at 12, around the side of the aperture, which is toward the burner, to support the cooking vessel above the plane of the top 5 of the flue box.

The top plate 5 is strengthened by a series of corrugations 11 embossed downward in its thickness between parallel lines drawn from the edges of the apertures 8 and 9.

With this device the heat of the burner flame is conserved, cold air is prevented from admixture with it, and the hot gases are induced to flow under a second cooking vessel. A hot plate is also provided on which other cooking may be conducted.

Having now particularly described my invention, I hereby declare that what I claim as new and desire to be protected in by Letters Patent, is:

1. A heat economizer for a gas stove, comprising the combination with a Bunsen burner, of a rectangular shallow elongated sheet metal box having a flange to support the same over the burner in a gas stove, the bottom of said box having an aperture near one end over the burner, which aperture conforms closely to the outside dimensions of the burner, the top of said box having an aperture in the end adjacent to the burner aperture and another aperture in the end farthest from the burner aperture, said box having transverse corrugations between said apertures and a projection extending in a circular direction around and adjacent to the farthest aperture between said aperture and said transverse beads, the ends of said projection being separated whereby to leave a discharge space for the products of combustion toward the end of the box farthest from the burner, said projection adapted to support a cooking vessel above the plane of the top of the box and prevent escape of the hot gases around that side of the aperture which is toward the burner, the aperture in the top nearest the burner being adapted to be closed by a cooking vessel, all being arranged substantially as shown and for the purposes described.

2. A heat economizer for a gas stove, comprising the combination with a Bunsen burner, of a rectangular shallow elongated box supported over the burner the bottom of said box having an aperture conforming closely to the outside dimensions of the burner in which aperture the flame from the burner may deliver, apertures in the top of the box over which apertures cooking vessels may be placed, one of which apertures farther from the burner has a raised projection around the side of the aperture which is toward the burner, said projection adapted to support a cooking vessel above the plane of the top plate and prevent escape of the hot gases around that side of the aperture which is toward the burner and will permit escape under the cooking vessel at the side farther from the burner.

In testimony whereof I affix my signature in presence of two witnesses.

JOHN KENDALL.

Witnesses:
E. N. MACFEAR, Jr.,
ROWLAND BRITTAIN.